United States Patent [19]

Farish et al.

[11] 4,080,578

[45] Mar. 21, 1978

[54] D.C. EXCITATION OF HIGH PRESSURE GAS LASERS

[75] Inventors: Owen Farish, Bearsden, Glasgow, Scotland; Richard L. Hundstad, Wilkinsburg; John L. Pack, Murrysville, both of Pa.

[73] Assignee: Westinghouse Electric Corporation, Pittsburgh, Pa.

[21] Appl. No.: 674,264

[22] Filed: Apr. 6, 1976

Related U.S. Application Data

[63] Continuation of Ser. No. 365,387, May 30, 1973, abandoned.

[51] Int. Cl.² ............................................. H01S 3/097
[52] U.S. Cl. ........................... 331/94.5 PE; 313/309
[58] Field of Search .............. 331/94.5 PE, 94.5 G, 331/94.5 C, 94.5 D; 330/4.3; 313/309, 351

[56] References Cited

U.S. PATENT DOCUMENTS

| | | | |
|---|---|---|---|
| 3,743,963 | 7/1973 | Bullis et al. | 331/94.5 |
| 3,758,874 | 9/1973 | Hoag | 331/94.5 |
| 3,860,877 | 1/1975 | Hoag et al. | 331/94.5 G |

OTHER PUBLICATIONS

Seguin, H. J. et al., Apllied Optics, vol. 11, No. 4, Apr. 1972, pp. 745-748.
Rusbült, D. et al., Atomkernenergie, BD. 19, (1972), LFG. 3, pp. 211-216.

*Primary Examiner*—William L. Sikes
*Assistant Examiner*—Marcus S. Rasco
*Attorney, Agent, or Firm*—M. P. Lynch

[57] ABSTRACT

A gas laser system with moderate speed gas glow through the optical cavity to facilitate D.C. excitation of the gas to lasing levels. An electrode assembly is positioned so as to provide a glow discharge transverse to the optical axis within the optical cavity when a high D.C. voltage is applied thereto. By maintaining the high rate of flow of gas through the cavity, the glow discharge is stabilized while the gas medium is maintained at high pressure. Proper choice of electrode geometry and flow rate of the gas through the optical cavity allows the laser system to operate at pressures from a few Torr to atmospheric pressure and above thereby producing a high power CW output.

7 Claims, 16 Drawing Figures

TO PINS 34

D.C. EXCITATION OF HIGH PRESSURE GAS LASERS

This is a continuation of application Ser. No. 365,387 filed May 30, 1973, now abandoned.

BACKGROUND OF THE INVENTION

1. Field of the Invention

This invention relates to high power gas lasers. It is specifically concerned with a continuous wave output laser operating at high pressure with moderate speed movement of gas through the laser cavity.

2. Description of the Prior Art

It gas been difficult to operate an electrically excited gas laser at high pressures because of overheating and breakdown of the gas medium and consequent instability of the discharge between electrodes. Arcing and instability of the discharge causes inefficient operation and ultimately prevents lasing operation entirely.

In order to circumvent such problems gas lasers, when operated at high pressure, have been operated in a pulse mode. The spark discharge and arcing which is more likely to occur at higher pressures is avoided because the available energy to the discharge is limited by selection of the pulsing rate and magnitude of the pulses themselves. The laser operates in a transient diffused glow mode and the tendency for arc formation at high pressure is avoided by generating short duration limited energy pulse glow discharges transverse to the optical axis of the laser.

Gas lasers have in the past been operated C.W. only at low pressures of 100 Torr and less when excited by a D.C. glow discharge used to populate the upper laser levels of the gas. At higher pressures in excess of 100 Torr the diffused glow discharge usually becomes unstable as the current increases and high temperature arc channels form in the gas causing arcing and breakdown of the laser operation. To avoid arc formation high repetition rate and limited energy pumping of the laser gas medium has been successfully tried. Pulse excitation systems have been used to achieve some of the advantages of high pressure excitation including higher power output. However the simplicity attendant D.C. excitation at high pressures offer additional advantages over the pulsed excitation systems.

Operation of a gas laser at high pressure with D.C. excitation offers a significant reduction in the complexity and cost of a laser system. The cost of the power supply for pulse operation is significantly higher than for the equivalent D.C. supply. Provided the system can operate at high pressure and with D.C. excitation one is able to generate high power at a much reduced cost without stringent switching requirements.

The influence of gas flow on prebreakdown corona currents in non-uniform field gaps under D.C. conditions is quite significant in that for certain electrode geometries large increases in power input can be attained without breakdown. For example in a point-to-plane type gap power input can be increased two orders of magnitude as the gas flow velocity is increased from zero to about 200 meters per second.

When applied to the gas medium of typical lasers it has been found by the applicants herein that moderate speed gas flow, exceeding about 10m/sec, increased the maximum prebreakdown currents experienced in the gap region even at high pressures. For instance in a needle-cylinder gap with a 1 inch long, ½ inch diameter cylinder, maximum prebreakdown currents in atmospheric $N_2$ have been increased while up to 850 watts of power have been dumped into the gap with a gas flow of about 30 meters per second.

SUMMARY OF THE INVENTION

According to the present invention, a D.C. excited high pressure gas laser system is provided which includes means for generating a moderate velocity flow of the laser gas through an optical cavity of the laser transverse to the optical axis while a high D.C. voltage is applied to an electrode assembly to produce a stable glow discharge in the optical cavity for raising the gas molecules to lasing energy levels. The high velocity flow stabilizes the glow discharge avoiding the arc discharge which normally accompanies the operation of a static gas laser.

DETAILED DESCRIPTION OF THE INVENTION

Figure 1:
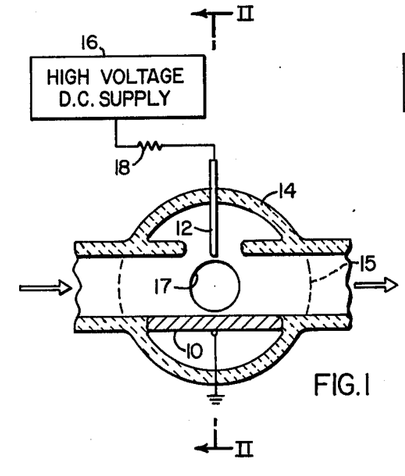
FIG. 1 is a sectional view of a D.C. excited laser having pin-plane geometry and transverse gas flow.

In FIG. 1 a laser system utilizing a pin-plane electrode geometry is shown having a gas flow transverse to the optical axis which enables the gas laser to operate under conditions of D.C. excitation at high pressure. In FIG. 1, electrode 10 is a planar surface continuous electrode maintained at some reference potential such as ground. Set opposite and perpendicular to electrode 10 is a row (FIG. 2) of pins 12 spaced apart from electrode 10 to define the discharge gap. The electrode assembly is rigidly positioned in the envelope 14, having an end wall 15 with opening 17 therein, which has a cylindrical shape in this embodiment. It will be appreciated that the particular configuration of the envelope can be varied. Gas flow is shown transverse to the discharge gap defined by electrodes 10 and 12. The high voltage D.C. supply 16 is connected through a ballasting resistor 18 to the pin cathodes 12 each of which is individually ballasted by resistors 19a, 19b, 19c, 19d, 19e so adapted to establish an electric field between electrodes 10 and 12.

The pin-type electrodes 12 disclosed in the Figures are easily constructed and are not an uncommon type of electrode used for electrical excitation of a gas in a laser system. But many other shapes, which for some applications may be better, will operate to provide discrete current sources across the discharge volume. Hollow cylinders enclosing coaxial pins sharp edged elements, tapered or conical rods, and pointed or blunted needles are a few alternative forms the electrodes can take. The important feature is that such electrode segments function as individual current or electron sources which can be separately ballasted if necessary to achieve a uniform and optically homogeneous discharge throughout the optical cavity. In this sense the electrode segments act to divide the total cross-section of the discharge volume giving greater selective control over the distribution of the power dumped into the discharge volume.

Figure 2:
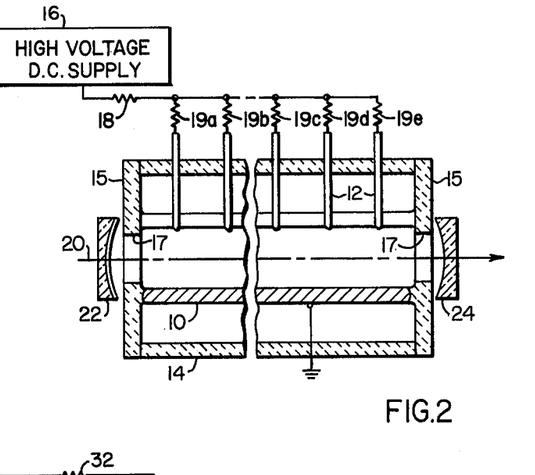
FIG. 2 is a cross sectional view of the device shown in FIG. 1 taken along line II.

In FIG. 2 the optical axis 20 of the laser system runs parallel to the planar surface of the electrode 10 and is aligned longitudinally with the gap defined by the electrodes 10 and 12. An optical cavity is defined by spaced optical elements 22 and 24 at each end of envelope 14 and adjacent end walls 15 aligned with openings 17. Optical element 22 is completely reflecting and the element 24 is partially reflecting and partially transmissive to couple coherent energy out of the cavity.

The flow of the active gas is transverse to the discharge between pin electrodes 12 and the planar surfaced electrode 10. Typically the flow velocities fall in the range from about 10 meters per second to sonic velocities. The optimum flow rate for maximizing The application of a high D.C. voltage to the electrode assembly comprised of electrodes 10 and 12, while the gas is propelled through the optical cavity, produces a glow discharge between the electrodes inducing laser action by excitation of the gas. Power inputs to the discharge gap of 130 watts per pin with a 2cm gap have been attained in a configuration with ten pins arranged similarly to that of FIGS. 1 and 2 without experiencing breakdown of the glow discharge. Additionally lasing action has been observed in a 400 Torr gas mixture of 1 part $CO_2$: 5 parts $N_2$: 50 parts He.

Utilizing the configuration of FIGS. 1 and 2 a glow discharge has been established along the axis of an optical cavity, having 109 pins equally spaced in a single row. With a transverse gas flow of 500 cubic feet per minute through the optical cavity of a gas mixture of 1 part $CO_2$: 1 part $N_2$: 4 parts He at a total pressure of 200 Torr, about 80 watts of 10.6 $\mu$ radiation has been generated when 3300 watts of electrical excitation power was dumped into the discharge gap region. At an increased pressure of 300 Torr and a power input of 2600 watts, the same device emitted 80 watts of 10.6 $\mu$ radiation. Increasing the pressure further to 400 Torr caused a decrease in efficiency as a 3900 watt power input was required to obtain a 55 watt output of 10.6 $\mu$ radiation. Changing the gas mixture to 1 part $CO_2$: 1 part $N_2$: 8 parts He caused a 20% increase in output power for the same input power to the discharge. Such experimental data from a low power device suggests that by varying the parameters of the device shown in FIGS. 1 and 2 including the spacing of pins, width of gap, number of pins, mixture of gas, flow rate and pressure of gas, the electric to optic conversion efficiency can be improved and probably optimized.

Additional data has been derived using the same electrode assembly with 109 pins equally spaced in a row opposite an electrode, its surface parallel to the optical axis, in an optical cavity 43 cm. in length between optical reflecting elements and further shows the influence of changing the parameters of the system (see Table I). The data contained in Table I is only representative and certainly not limiting as to power inputs and outputs and resultant laser efficiencies which are possible.

TABLE I

| GAS MIXTURE ($CO_2$: $N_2$: He) | PRESSURE (Torr) | FLOW RATE (m/sec) | INPUT POWER (watts) | GAP (mm) | PIN SPACING (mm) | OUTPUT POWER (watts) | NET EFFICIENCY |
|---|---|---|---|---|---|---|---|
| 1: 1: 8 | 300 | 45 | 2630 | 9.5 | 3.2 | 80 | 3.0% |
| 1: 1: 4 | 300 | 45 | 3650 | 15.9 | 3.2 | 80 | 2.2% |
| 1: 1: 6 | 450 | 45 | 3750 | 15.9 | 3.2 | 80 | 2.1% |
| 1: 1: 120 | 722 | 45 | 5500 | 15.9 | 3.2 | 22.5 | 0.4% | power output is dependent on the choice of dimensions of the electrode assembly, pressure of the gas and the type of gas medium. For a 100 watt output device the gap distance between pins 12 and planar surface of electrode 10 might typically be of the order of a centimeter while the spacing between pins might be of the order of half a centimeter. However for higher output power devices the gap distance and pin spacing can be significantly increased, it having been found that this device is scaleable for high power output to several kilowatts and above. The flow system itself, although not shown, contains pumping means to move the gas at some selected velocity, heat exchanging means for cooling the gas and means for recycling it through the system. These features are well known in the art and consequently are not shown.

Figure 3A:
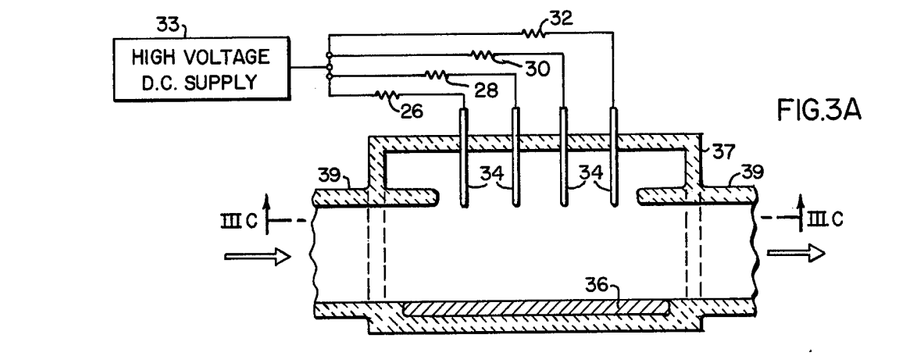
FIG. 3A illustrates a D.C. excited laser with pin-plane electrode geometry and transverse gas flow having a plurality of rows of pins.

In FIG. 3A the electrode assembly of FIG. 1 has been modified to add three additional rows of pin elements 34, each row spaced equidistant from the next adjacent row being close enough to provide a blending of the discharges for the purpose of giving an optically homogeneous medium. The pins 34 are set opposite electrode 36 defining a discharge gap region through which the laser gas flows. As may be required, more rows of pins than are shown can be added. The entire electrode assembly is rigidly set in a sealed envelope structure 37 to maintain the pressure and integrity of the gas medium.

Instead of a single row of individually biased pin electrodes 12 connected through the single ballasting resistor as was shown in FIG. 1, four rows of pin electrodes 34 are provided, each row of electrodes 34 being separately ballasted by resistors 26, 28, 30 and 32 respectively. Because of possible unequal current sharing among the pins the resistors 26, 28, 30 and 32 are each chosen for optimizing operating conditions of the system by equalising the current distribution. One factor effecting the stability of the discharge is that as the gas flows through the cavity and past each succeeding row of pinplane discharges the temperature of the gas increases. This effects the stability of the discharges from the pins to the opposing continuous electrode and particularly the discharges downstream from the first row of pins 34. The ballasting resistors can be chosen to compensate for this effect. Effective ballasting, if required, can also be obtained by using pins of chosen size and of materials having different resistivities such that the resistance will increase with increasing current. The pin electrodes can be fabricated of tungsten or stainless steel for example and in some instances can be coated as with barium oxide.

Figure 3B:
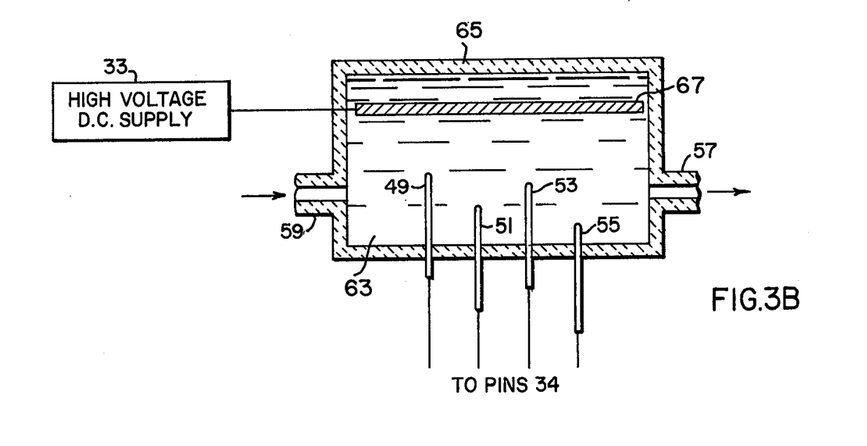
FIG. 3B is a sectional view of an electrolytic bath substituted for the discrete ballast resistors of FIG. 3A.

The plurality of ballasting resistances, particularly in a large system incorporating hundreds or thousands of individual pins, can be complex and costly if discrete resistors are used. Consequently a simpler and more easily adjustable ballasting technique is to use an electrolytic bath as shown in FIG. 3B. A container 65 holds a fluid 63 of high dielectric strength which is cycled continuously through container 65 by means of a closed loop system which would include pumping means and heat exchange means. Only the inlet and outlet orifices 57 and 59 connecting the container to the closed loop system are shown since such a system is well known to those skilled in the art.

Immersed in the fluid 63 is an elongated electrode 67 and rod like electrodes 49, 51, 53 and 55 which are electrically connected to corresponding rows of pins 34. The electrodes 49, 51, 53 and 55 are movable to increase or decrease the gap with electrode 67. The resistance can thereby be selectively adjusted for each row of pins 34; increasing or decreasing the gap leads to corresponding increases or decreases in the resistance.

Figure 3C:
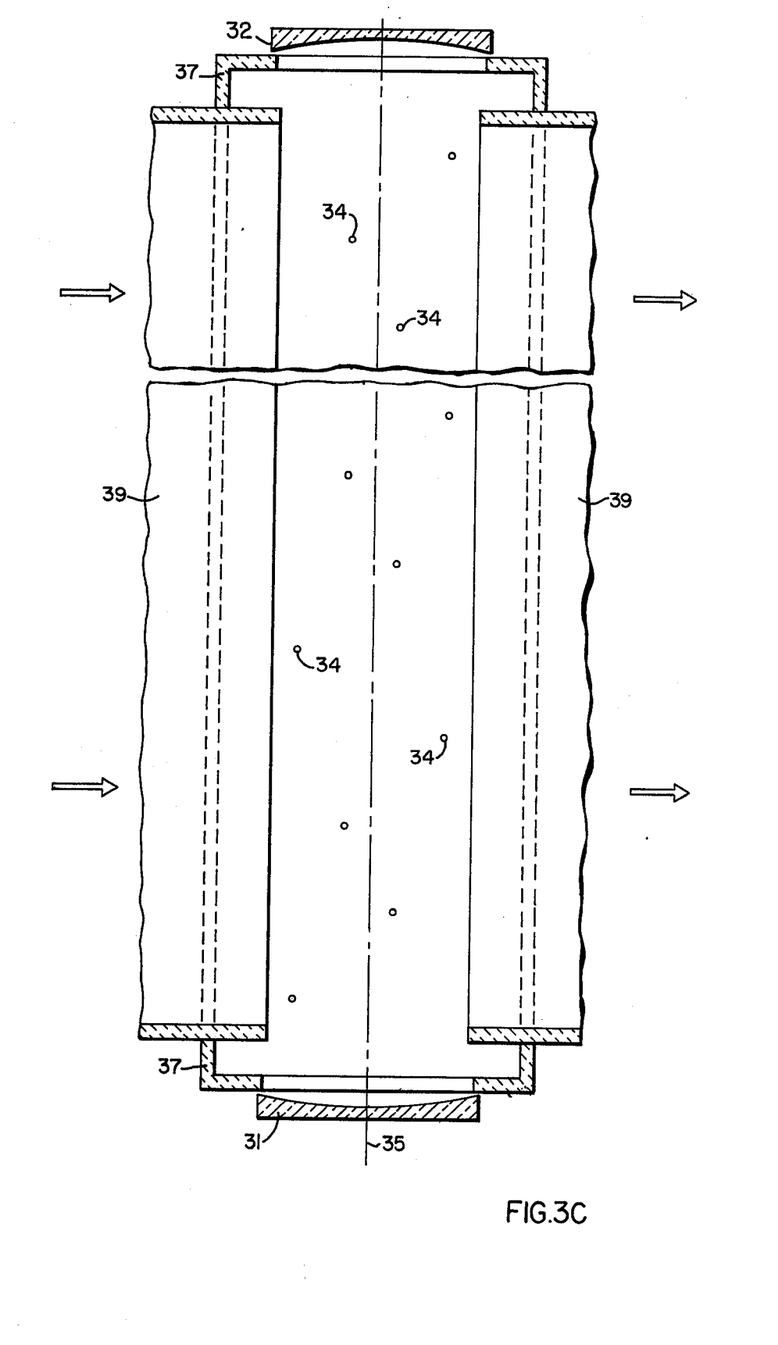
FIG. 3C is a partial section taken along line IIIB of FIG. 3A, showing the staggered positioning of the pin electrodes in one particular embodiment.

A primary advantage gained in using a plurality of rows of pins as in FIGS. 3A, 3B and 3C is that a greater output per unit length of the optical cavity is obtained while a broader output beam is generated.

In FIG. 3C a sectional view of the multi-row electrode assembly is taken parallel to the longitudinal optical axis 35. Optical elements 31 and 32 are positioned at either end of envelope 37 and are aligned with optical axis 35 to define an optical cavity therebetween. Gas flow is directed through a plenum 39 passing through the cavity and transverse to the discharge gap between pins 34 and electrode 36. Four rows of pins 34 are arranged in a staggered arrangement which can aid in avoiding possible interference effects between individual pin discharges in a streamline. The pins 34 can also however be in line row to row without impairing the glow discharge. The spacing between pins and between rows is adjusted for optimizing laser performance.

Utilizing an electrode arrangement similar to that shown in FIGS. 3A and 3C, having pins staggered and in four rows opposite a second continuous surface electrode, a glow discharge has been established in the discharge gas defined between pins 34 and electrode 36. With the first electrode including a total of 109 pins arranged opposite the second electrode in the optical cavity, observations of laser action have been made while changing various parameters of the system. Some representative results are shown in Table II for a low power device but such results are not meant to be limiting as to either power inputs and outputs or the resultant laser efficiencies which are obtainable with the device of FIGS. 3A, 3B and 3C.

TABLE II

| GAS MIXTURE ($CO_2$: $N_2$: He) | PRESSURE (TORR) | FLOW RATE (m/sec) | INPUT POWER (watts) | GAP (mm) | PIN SPACING (mm) | OUTPUT POWER (watts) | NET EFFICIENCY |
|---|---|---|---|---|---|---|---|
| 1: 3: 16 | 350 | 45 | 3280 | | 3.2 | 80 | 2.5% |
| 1: 1: 33 | 350 | 45 | 3333 | 22.2 | 3.2 | 100 | 3 % |

By proper arrangement of the pin electrodes 34 and choice of system parameters such as pressure, gas mixture and flow rate, power inputs of the order of 1 kw per in.$^3$ (60 watts per cc) are attainable with multiple rows of pins. Thus a glow discharge established by D.C. excitation is practical for a relatively large volume of gas and a discharge of the relatively short length of 150 cm. could support in excess of 100 KW power input where the discharge has a cross sectional area of 10 to 20 cm$^2$.

Figure 4:
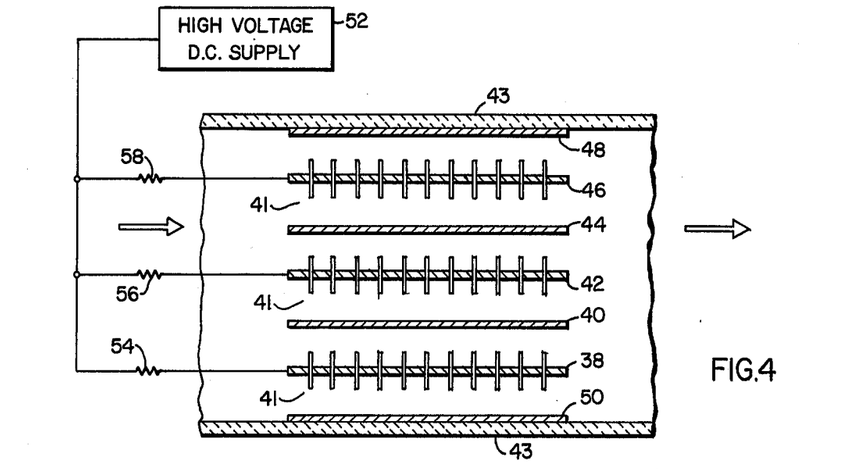
FIG. 4 is a cross-sectional view of a D.C. excited laser having multiple gaps in a stacked pin-plane electrode geometry.

In FIG. 4, the pin-plane electrode arrays are stacked and an even greater density of input energy is achieved. In FIG. 4, which is an end view of a multi-gap pin electrode assembly, the pin electrode arrays 38, 42 and 46 are positioned in a stacked manner interspaced between the planar surfaced electrodes 40, 44, 48 and 50 within envelope walls 43. The gas flow is transverse to the discharge region defined by the pins 41 of each array in relation to the planar electrodes 40, 44, 48 and 50. Each pin electrode array 38, 42 and 46 is separately ballasted to a high voltage D.C. supply 52. The problems of current sharing and heating of the gas as it flows through the discharge region is more intensified in this particular electrode geometry, than in that discussed above. Therefore the ballasting resistors 54, 56, 58 are used to equalize the currents carried by the various pins and to improve the stability of the glow discharge throughout the entire region. It will be understood that individual pins and rows are ballasted as in FIGS. 2 and 3a, but for simplification all the individual ballast resistances are not shown in FIGS. 4 and 5.

Figure 5:
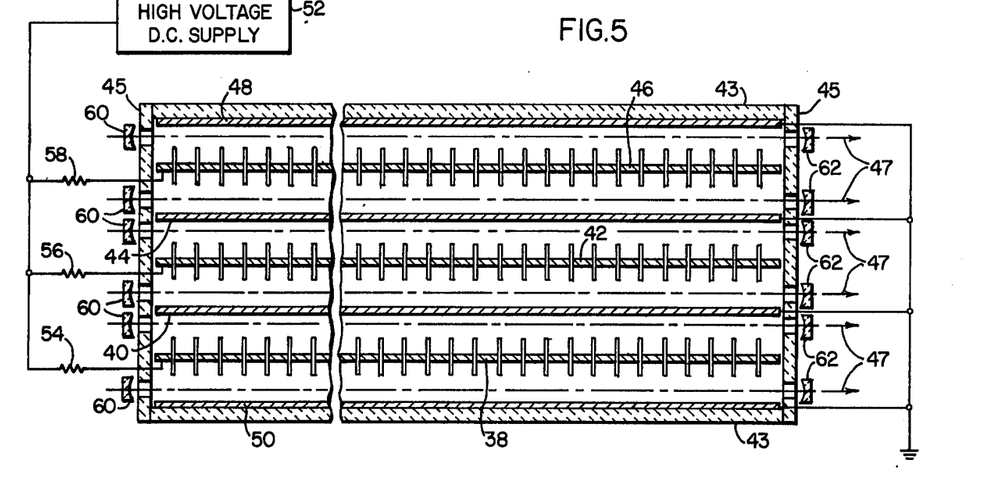
FIG. 5 is a cross-sectional view of the device shown in FIG. 4 taken parallel to the optical axis.

A sectional view taken along the longitudinal axis of the device of FIG. 4 is shown in FIG. 5. In this view it will be seen that a series of optical cavities are defined by a series of optical elements 60 and 62 positioned adjacent and walls 45 at either end of the optical cavity and normal to the optical axes 47. Laser output beams are shown through elements 62. Additional optics can be provided to operate on the emitted beam as may be desired.

One of the advantages to stacking the arrays of pins 38, 42 and 46 and planar surfaced electrodes 40, 44, 48 and 50 as in FIGS. 4 and 5 is the possibility of reducing the individual gap width between pin and planar surfaced electrodes while still obtaining the same output as for a single gap arrangement of the same cross-sectional area. By reducing the gap distance the glow discharge is further stabilized and the device can operate at a significantly lower input voltage from the high voltage D.C.

supply 52. Another advantage of the electrode geometry of the device shown in FIGS. 4 and 5 is to increase the uniformity of the discharge across the effective discharge volume.

One simplifying modification to the above structure is replacement of the rows of pins by an edge or strip. By applying a negative potential to the edge, uniformly distributed individual discharges can be established across the gap from edge to plane under static gas conditions. If the edge is maintained at a positive potential while a negative potential is applied to the planar surfaced electrode the glow discharge will be continuously homogeneous along the edge but less stable. The use of edges or strips in a D.C. excited flowing gas system such as described above to replace the rows of pins 46, 42 and 38 greatly simplifies the construction of the electrode assembly.

Figures 6, 7:
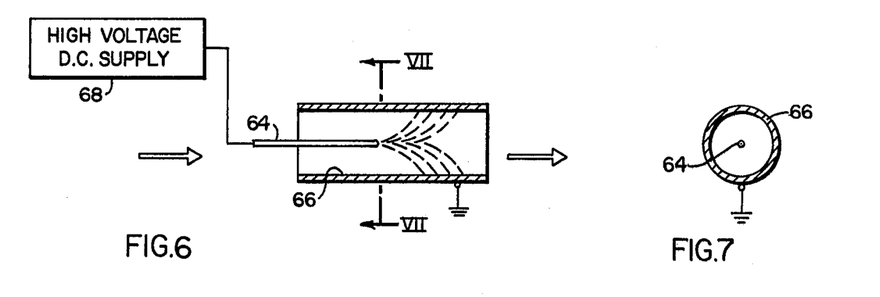
FIG. 6 shows schematically a glow discharge in a needle-cylinder geometry with gas flow.
FIG. 7 is a cross sectional view of the device shown in FIG. 6.

A high power input per pin is possible using a needle-cylinder electrode geometry. In FIGS. 6 and 7 a discharge is shown between the pin 64 and the interior wall of the cylinder 66 as gas flows along the longitudinal axis of the cylinder and pin. High voltage D.C. supply 68 is connected to pin 64. Although a high input power can be applied to a single pin using the geometry of FIGS. 6 and 7, stacking the cylinders to give multiple pin-cylinder gaps is ineffective for constructing an optical cavity. Adjacent gaps would be optically blocked one from another by cylinder walls and consequently no amplification action could take place. However, by notching the cylinders on opposite sides and then stacking the cylinders so as to align the notches a configuration results in which the optical axis of the device can be aligned with the notches.

Figure 8:
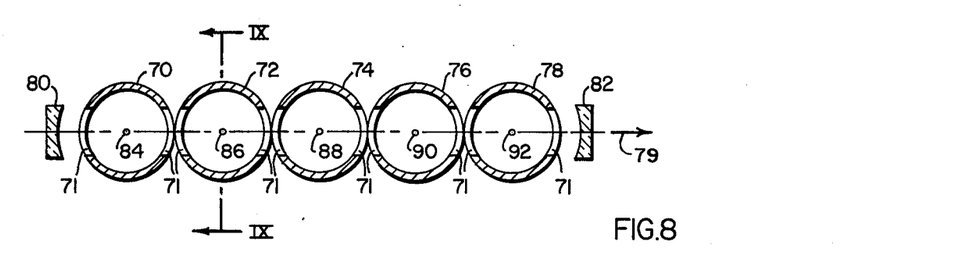
FIG. 8 is a sectional view along the optical axis of a D.C. laser using notched cylinders as a part of the electrode assembly.

In FIG. 8 notched cylinders 70, 72, 74, 76 and 78 are so aligned that each communicates with the next adjacent through the notches 71 in the walls of the cylinders. Gas flow is directed along the axis of the pins 84, 86, 88, 90 and 92 and transverse to the discharge which is formed between the pins and the walls of the notched cylinders. The optical axis 79 of the laser 15 transverse to the gas flow. Optical elements 80 and 82 positioned at either end of the series of notched cylinders 70, 72, 74, 76 and 78 aligned with the notches 71 cut therein, define an optical cavity therebetween. One of the elements 80 is completely reflecting and the other 82 is partially reflecting and partially transmissive. It will be understood that this configuration would be sealed within an envelope so as to maintain the integrity of the gas medium while allowing for gas flow through the cavity.

Figure 9:
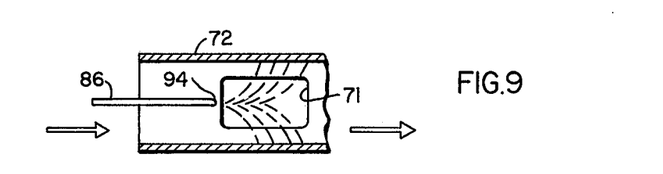
FIG. 9 is a cross sectional view of the device of FIG. 8 taken along line IX.

Using a pin-cylinder electrode geometry as in a device like that shown in FIGS. 6 and 7, 850 watts has been dumped into a relatively small scale electrode gap filled with nitrogen gas at atmospheric pressure and flowing at the rate of 30 meters per second. The large power input into this electrode geometry without breakdown of the gap and without arc discharges to interrupt lasing action is a distinct advantage of the above described stacked, notched cylinder configuration of FIGS. 8 and 9.

In the configuration of FIG. 8 the direction of gas flow is parallel to the needles 84, 86, 88, 90 and 92. The discharge region is more clearly shown in FIG. 9, the glow discharge being generally radial from the end 94 of the pin 86 to the sidewall portions of cylinder 72. The gas flow is thus transverse to the discharge.

Figure 10:
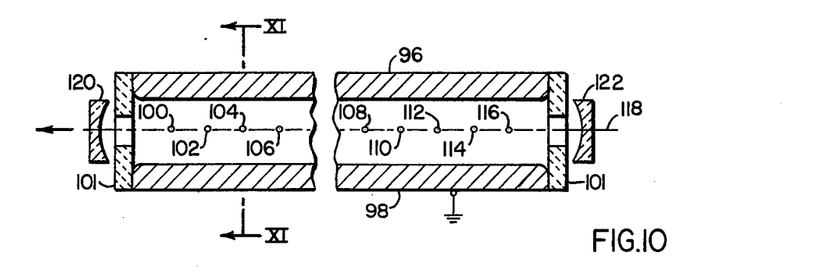
FIG. 10 is a sectional view of a D.C. excited laser using pin-plane geometry with gas flow parallel to the axis of the pins and to the planar surfaces of the electrodes.
Figure 11:
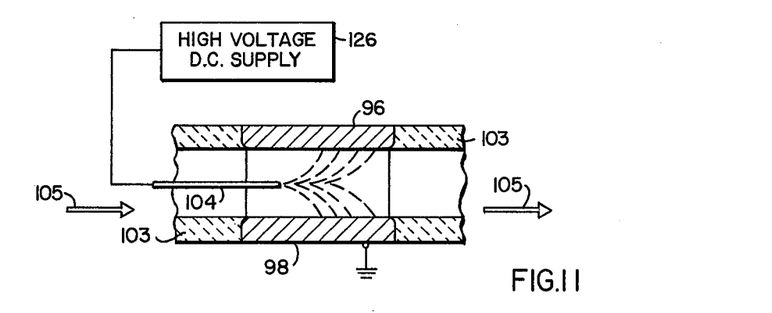
FIG. 11 is a cross-sectional view of the device shown in FIG. 10 taken along line XI.

In FIGS. 10 and 11 the electrode assembly shown in FIG. 8 has been modified to incorporate two electrodes 96 and 98 having planar surface portions in place of a series of stacked notched cylinders. This configuration is of a simpler construction and still provides for gas flow parallel to the surfaces of the electrodes but transverse to the electrical discharge. In FIG. 10 the electrodes 96 and 98 are spaced apart with portions of their surfaces essentially parallel one to the other. A pin array composed of a plurality of pins 100, 102, 104, 106, 108, 110, 112, 114 and 116 in a single row are approximately equidistant between the electrodes 96 and 98 and orthogonal to the optical axis 118. The optical cavity is defined by optical elements 120 and 122 placed respectively at each end of the electrode assembly ajacent end walls 101. Optical element 122 is essentially totally reflecting while optical element 120 is partially reflecting and partially transmitting. Gas flow indicated by arrows 105 through the cavity is parallel to the surfaces of electrodes 96 and 98 and along the longitudinal axis of the pins 100 to 116 through ducts 103. As can be clearly seen in FIG. 11 the electrical discharge is from the end of the pin 104 to the surface of the two electrodes 96 and 98. This electrode configuration although not producing as homogeneous or uniform a discharge as the stacked notched cylinder assembly, provides a more simply constructed electrode configuration than that shown in FIG. 8.

Energy is supplied to the discharge volume from high voltage D.C. supply 126 connected to the array of pins 100–116 as shown in FIG. 11.

Figure 12:
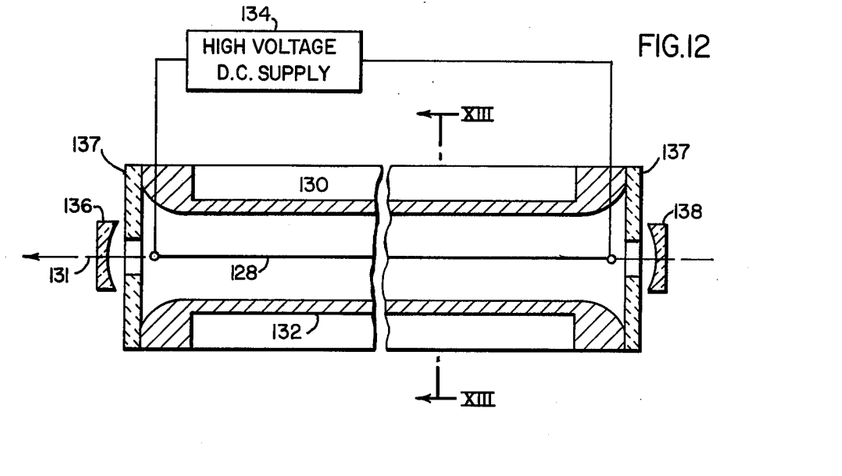
FIG. 12 is a sectional view of a D.C. excited laser using an electrode assembly including corona wires and planar surface electrodes.
Figure 13:
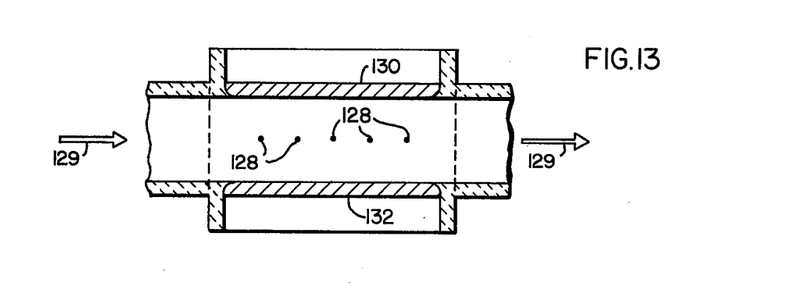
FIG. 13 is a cross sectional view of the device shown in FIG. 12 taken along line XIII.

In FIGS. 12 and 13 the continuous fine wires 128 have been substituted for the pin array shown in the device of FIG. 10. In particular a corona wire 128 can be positioned parallel and equidistant between the planar surfaces of electrodes 130 and 132. A corona discharge is then formed between the wire and the planar surfaces when a sufficiently high D.C. voltage is applied from the supply 134. The gas flows through the discharge volume at high velocity in a direction parallel to the planar surface portions of electrodes 130 and 132 and orthogonal to the optical axis 131. When the gas has been excited to lasing levels, lasing action occurs due to the resonant action of the optical cavity defined by optical elements 136 and 138 positioned adjacent end walls 137. FIG. 13 shows a cross section of the device in which five continuous wires 128 are set equidistant and parallel one to another along the midplane of the discharge volume. Gas flow indicated by arrows 129 is across the series of parallel wires and transverse to the discharge gap region.

One advantage of using the fine corona wires 128 in place of pin arrays is that high current pre-breakdown glow discharges have been observed having input powers upwards to approximately $10^4$ watts per meter. Clearly with this magnitude of input power and utilizing an arrangement as shown in FIG. 13 in which five parallel continuous wires 128 are shown, it would be possible to apply input power to the discharge gap of the order of 50 kilowatts per meter.

The electrode geometries disclosed thus far have been used to develop non-uniform fields. However, uniform field discharge utilized in a D.C. excited high pressure gas laser has certain advantages.

The uniform field discharge provides a more uniform cross section, higher energy density, and operates at higher efficiency. However, the discharge in a uniform field is typically less stable and usually the glow discharge is transient. No pre-breakdown corona occurs and consequently at very low currents (maximum stable currents are typically less than $10^{-6}$ amp.) instead of a stable glow discharge one encounters arcing and breakdown of the discharge gap. However, stability of the discharge can be enhanced in a uniform field configuration if there are sufficient independent initiating electrons distributed across the cathode electrode to initiate a uniform discharge. In a copending application Ser. No. 365,389 filed May 30, 1973 by Owen Farish and Richard Hundstad, now abandoned, and assigned to the present assignee generation of initiating electrons is discussed under pulsed conditions. A uniform field discharge in the present D.C. excited high pressure gas laser is possible provided there is sufficient gas flow to stabilize glow discharge and to avoid arc formation while utilizing techniques discussed in the above application to supply the essential electrons to initiate the discharge which is D.C. supported.

Figure 14:
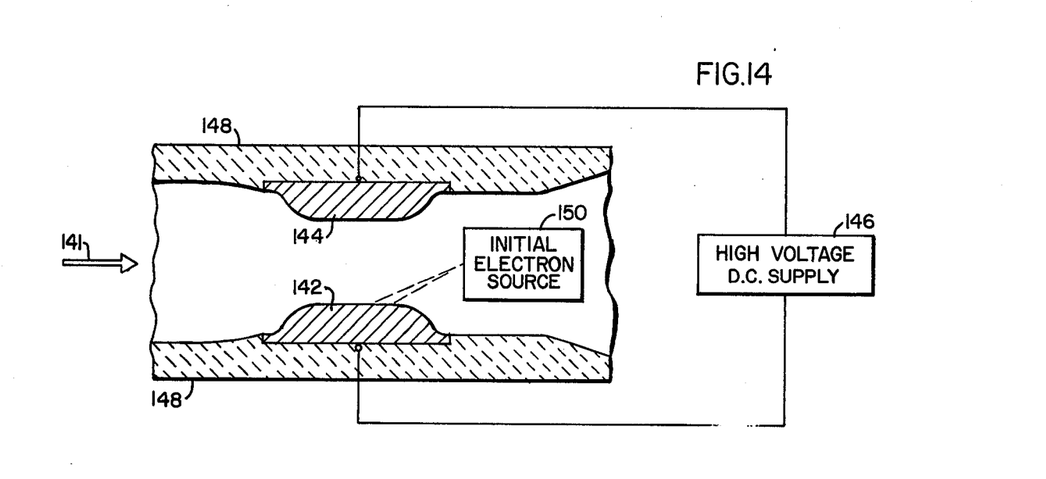
FIG. 14 is a cross section of a uniform field D.C. excited gas laser device.

FIG. 14 shows an electrode configuration in which a D.C. discharge is maintained in a uniform field with only low level irradiation required to provide initial electrons. The uniform field is established between electrodes 142 and 144. A high voltage D.C. supply 146 is connected to the electrodes 142 and 144. The gas flow indicated by arrow 141 is transverse to the discharge between electrodes 142 and 144 flowing through the gas duct 148. Gas pumping and recirculating means, not shown, would be used to move the gas through the cavity at some constant velocity. The initial electrons are supplied to the discharge gap by electron source means, 150. This could for instance be a UV lamp positioned to irradiate continuously the cathode electrode 142 or it could be a short dielectric gap pulsed to cause a corona discharge which would provide the free electrons for initiatory action.

There are several modes of operation for achieving a uniform glow discharge in the uniform field gap of a D.C. excited high pressure gas laser. The uniform field electrodes can be initially stressed by applying a D.C. voltage thereto to a point just below breakdown and then initiating the glow discharge between the electrodes 142 and 144 by supplying a pulse of initiating electrons across the surface of the cathodic electrode 142. Such initial electrons can be supplied, for example, by pulsing a narrow gap between materials of high dielectric constant. Such pulsing will produce a corona discharge which in turn supplies electrons to initiate the discharge across the uniform electric field. The glow discharge thus established is stabilized by high velocity gas flow while power is supplied from the D.C. power supply 146 to the discharge volume.

Initiation of the discharge can also be facilitated by a momentary overvoltage applied to the electrodes 142 and 144 once the initiating electrons have been injected into the discharge volume.

What we claim is:

1. A D.C. excited high pressure gas laser apparatus comprising:
    a gas flow enclosure,
    a plurality of resonant optical cavities including optical reflective elements passively terminating each end of said cavities,
    a gas medium at high pressure suitable for lasing action,
    means for producing a flow of said gas through said plurality of resonant optical cavities,
    a plurality of stacked electrode assemblies commonly contained within said gas flow enclosure and each spaced across a respective one of said resonant optical cavities and including at least two spaced-apart electrodes defining a discharge gap region therebetween, and
    a high voltage D.C. supply connected to each of said electrode assemblies for initiating and maintaining a glow discharge within each of said resonant optical cavities for exciting said gas medium to upper energy levels to induce lasting action.

2. The laser apparatus of claim 1 wherein each electrode assembly includes a first electrode having a plurality of pins set orthogonal to said gas flow and further includes a second electrode having continuous planar surface portions opposite and orthogonal to said pins of said first electrode.

3. The laser apparatus of claim 2 wherein said high voltage D.C. supply is connected through ballast resistances to said stacked electrode assemblies for stabilizing and equalizing said glow discharge within said discharge gap regions.

4. A method of operating a laser apparatus including an optical cavity, means for creating a population inversion in a flowing gas medium in the optical cavity and stimulating a beam of radiation from the gas medium, and an electrode assembly comprising a first electrode consisting of a plurality of individual electrode segments, forming a two dimensional array extending downstream in said flowing gas medium, with each electrode segment functioning as a current source, and a spaced-apart second electrode defining a discharge gap region therebetween, the discharge gap region trasversing the optical cavity of the laser apparatus, comprising the steps of,
    flowing a gas medium suitable for lasing action through the optical cavity;
    maintaining a pressure in the discharge gap region suitable for lasing action;
    applying a D.C. potential between the first and second electrodes for producing discharges between said individual electrode segments of said first electrode and said second electrode and establishing a glow discharge within said optical cavity for exciting said gas medium to energy levels to induce lasing action, the discharges associated with said individual electrodes segments progressively increasing the temperature of the gas medium as the gas medium flows past the downstream positioned electrode segments; and
    compensating for said increases in the temperature of the flowing gas medium by varying the current distribution among the individual electrode segments comprising said two dimensional array.

5. A D.C. excited gas laser apparatus comprising:
    a resonant optical cavity including optical reflective elements terminating each end of said cavity,
    a gas medium suitable for lasing action,
    means for producing a flow of said gas medium through said resonant optical cavity substantially perpendicular to the optical axis of said laser apparatus,
    an electrode assembly including a first electrode consisting of a plurality of individual segments forming a two dimensional array extending downstream in said flowing gas medium, each of said electrode segments functioning as a current source, and a spaced-apart second electrode defining a discharge gap region therebetween,
    a D.C. potential supply means connected to said electrode assembly for establishing an electric field between said first and second electrodes and producing discharges between said individual electrode segments of said first electrode and said second electrode to establish a glow discharge within said resonant optical cavity for exciting said gas medium to energy levels to induce lasing action, the discharges associated with said individual electrode segments progressively increasing the temperature of the gas medium as the gas medium flows past the downstream positioned electrode segments, and means for establishing the current distribution among said electrode segments of said first electrode to compensate for said temperature increases in said flowing gas medium.

6. A method as claimed in claim 4 wherein said compensating step consists of selectively ballasting downstream electrode segments to compensate for increases in the temperature of the flowing gas medium resulting from discharges associated with respective upstream electrode segments.

7. A laser apparatus as claimed in claim 5 wherein said means for establishing the current distribution among said electrode segments consists of electrical impedance means associated with the electrode segments, the electrical impedance means associated with said downstream electrode segments being selected to compensate for increases in the temperature of the flowing gas medium resulting from discharges associated with respective upstream electrode segments.

* * * * *